Patented May 22, 1945

2,376,743

UNITED STATES PATENT OFFICE 2,376,743

CARBOHYDRATE SOLUTIONS

Bruno Wendt, Dessau, Germany; vested in the Alien Property Custodian

No Drawing. Application January 4, 1941, Serial No. 373,185. In Germany December 19, 1939

6 Claims. (Cl. 106—162)

My present invention relates to carbohydrate solutions and more particularly to the change in viscosity of such solutions.

It is an object of my invention to provide a process for increasing the viscosity of aqueous carbohydrate solutions.

Another object is the provision of a process for increasing the viscosity of organic carbohydrate solutions containing water.

Further objects of my invention will become apparent from the following description.

I have found that the viscosity of solutions containing carbohydrates or derivatives thereof such as glucose, dextrine, starch (arrow root), or derivatives of cellulose can be increased by adding compounds having a substantive character. It is noted that solutions containing only these compounds in amounts as used according to the invention do not possess a perceptible viscosity compared with the increase of viscosity which they effect.

The change in viscosity does not depend only on the nature of the added substance but on that of the substratum. It has been found that the viscosity of substances which are very viscous is effected more appreciably than the viscosity of compounds which yield weakly viscous solutions as, for instance, sugar and dextrine. If, however, concentrated solutions of the latter compounds are used the reached increase of viscosity can already be distinguished with the naked eye. Solutions of high-viscous derivatives of cellulose such as methylcellulose or hydroxyalkylcellulose can even be converted into solid jellies by adding substantive substances.

Attempts have shown that the efficiency of the added substances is decreased if electrolytes are present. It is therefore advantageous to use solutions containing at most a small amount of electrolytes.

All known substantive compounds can be used in the process of the present invention. Colorless or nearly colorless compounds are especially valuable. Aqueous solutions containing medium-viscous or high-viscous methylcelluloses or hydroxyalkylcelluloses are preferred for testing the efficiency as viscosity increasers of the substantive compounds as such cellulose derivatives are intensely affected by substantive compounds.

The following substantive compounds are especially suitable:

o-Hydroxy-carboxylic acid amides as, for instance, hydroxynaphthoic acid alkylamides and hydroxynaphthoic acid arylamides such as 2,3-hydroxynaphthoic acid diphenylamide, 6-ethoxy-2,3-hydroxy-naphthoic acid-p-nitrophenylamide, bis-(2,3 - hydroxynaphthoyl) - p -phenylenediamine, bis-(2,3 - hydroxynaphthoyl) - dianisidine, bis-(2,3-hydroxynaphthoyl)-diaminostilbene, bis-(1,2-hydroxynaphthoyl)-benzidine, arylides of 7-hydroxynaphthalene-1-carboxylic acid, further-more derivatives of salicylic acid such as arylides of 2-hydroxydiphenyl-3-carboxylic acid, 5-phenyl-salicoyl-acetone, amides of 2-hydroxy-anthracene-3-carboxylic acid, hydroxycarbazole carboxylic acids, hydroxynaphthocarbazole carboxylic acids and hydrogenated products thereof, diphenyleneoxide hydroxycarboxylic acids, diphenylenesulfide hydroxycarboxylic acids, 3-hydroxydiphenyl-aminocarboxylic acid, hydroxychrysene carboxylic acid, hydroxyfluorene carboxylic acid, hydroxyphenanthrene carboxylic acid and hydroxynaphthazone, hydroxytriazoles and similar heterocyclic compounds.

Moreover, colorless compounds are valuable which contain special groups capable of rendering the compound substantive. Such groups are often described as constituents of azo dyestuffs (confer, for instance, "Kolloidchemische Beihefte, vol. 34, p 218; 1931"). Compounds containing such groups are also employed as diazo- or coupling components for forming dyestuff with the fiber as described in many patent specifications. Groups adapted to render substances substantive are, for instance, derived from the following compounds:

Benzidine and derivatives thereof, diaminofluorene, diamino-diphenyleneoxide, diamino-diphenylenesulfide, diamino-carbazole, 1,4- and 1,5-naphthylenediamines, diaminodiphenylamine, diaminostilbene, diaminodiphenylurea, diaminodiphenylthiourea, compounds which contain several groups of aminobenzoyl or several similar groups. Furthermore, substances are suitable which contain the group of aminonaphthol or derivatives thereof as, for instance, 2-amino-5-naphthol-7-sulfo acid, 1-amino-5-naphthol-7-sulfo acid and derivatives thereof, for instance alkyl-, phenyl-, benzoyl-, aminobenzoyl-, aminobenzoyl-aminobenzoyl-compounds and ureas thereof. Moreover, the arylides of acetoacetic acid, cyanacetic acid, oxalacetic acid, acetonedicarboxylic acid, benzoylacetic acid, terephthalacetic acid, naphthoylacetic acid, hydroxynaphthoylacetic acid and similar compounds are substantive. Of the heterocyclic rings which render compounds substantive the following rings are for instance suitable: thiazole, triazole and imidazole rings. Compounds with such rings are, for instance, dehydrothiotoluidine, the sulfo acid thereof and similar compounds, triazoles and imidazoles of aminonaphtholsulfo acids and 1,3,5-triazine compounds. These classes of compounds, for instance, include products obtained by reacting 1 mol of benzidine-disulfo acid, diaminostilbenedisulfo acid or diaminodiphenylureadisulfo acid with two mols of cyanurchloride and subsequently saponifying the chlorine atoms. Instead of the saponification a reaction with aniline or other aliphatic, aromatic hydroaromatic or heterocyclic amines or hydroxy compounds may also be carried out, whereupon, if desired, the chlorine not reacted is saponified. The following compounds are especially suitable:

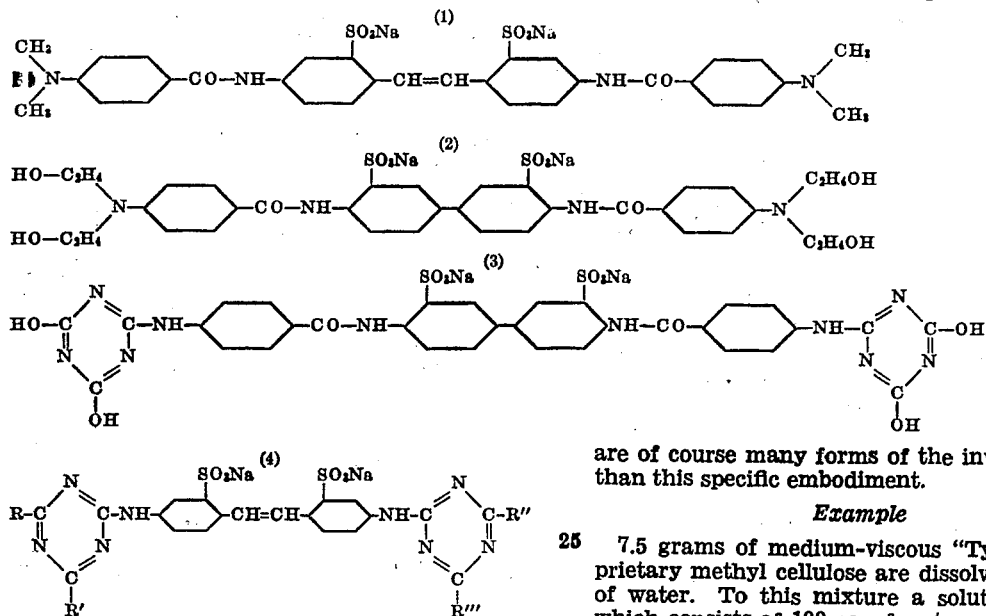

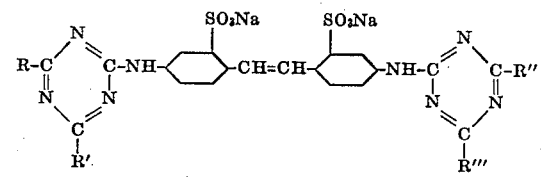

wherein R, R', R" and R'" represent hydroxyl or a monovalent organic radical, for instance, of isoamylamine, di-oxethylamine, dodecylamine, cyclohexylamine, aniline, chloroaniline, anisidine, p-cyclohexylaniline, phenol, thiophenol, aminobenzthiazole or aminobenzimidazole.

The substantive compound may be mixed with the water before or after the addition to the water of the carbohydrate. In the former instance a very high speed of solution is attained. The substantive compounds may, moreover, be added in the production of the colloid, for instance, during its precipitation or desiccation. Thus products are obtained which from the outset contain substances capable of increasing the viscosity. Similar products may be produced by simply mixing the components with one another or grinding them together in dry condition. The quantity of the compound to be added is dependent on its nature and that of the colloid as well as on the viscosity desired. Favorable effects are reached when the quantity of the substantive compound amounts to 2–25% of the quantity of the colloid. Besides the carbohydrates above mentioned other carbohydrates may also be used, for instance fructose or cane sugar.

The products prepared by using derivatives of cellulose are especially valuable. Useful derivatives of cellulose are, for instance, methylcelluloses, hydroxyalkylcelluloses, and acetylcelluloses extensively hydrolyzed such as acetyl-celluloses soluble in aqueous acetone of 40% strength. Of the colorless or slightly colored substances serving to increase the viscosity those compounds are important which are neither diazotizable nor capable of coupling. The mixtures or solution of the colloids and added substances may be used, for instance, for the preparation of finishing and sizing products. In this case a considerable percentage (75%) of derivative of cellulose is saved so that the costs of preparation are lower than those of the products hitherto employed and having the same viscosity. The substantive compounds may also serve to regulate the viscosity of spinning solutions. Instead of acetone other solvents for derivatives of cellulose may be used, for instance dioxane.

The more detailed practice of the invention is illustrated by the following example. There are of course many forms of the invention other than this specific embodiment.

*Example*

7.5 grams of medium-viscous "Tylose" a proprietary methyl cellulose are dissolved in 900 cc. of water. To this mixture a solution is added which consists of 100 cc. of water and 1.5 grams of a compound corresponding to the following formula:

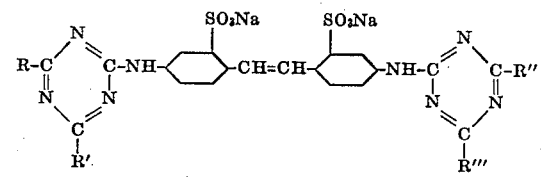

wherein R and R" are the radical of aniline and R' and R'" hydroxyl. A sizing product is thus obtained which is of a property similar to that of a product made in usual manner from 23 grams of Tylose and 1000 cc. of water.

I claim:

1. A process for increasing the viscosity of a solution of the member of the group consisting of water-soluble carbohydrates and cellulose derivatives soluble in solvents containing a substantial amount of water, said solution containing a substantial amount of water and at most a small amount of electrolytes, which comprises adding to said solution a 1,3,5-triazine derivative which is at most slightly colored one of the groups of compounds consisting of

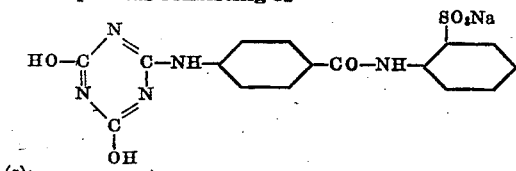

(a),

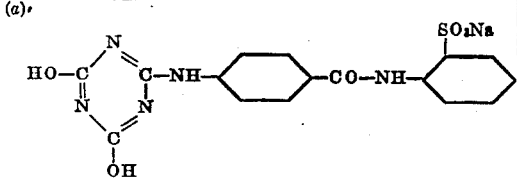

(b)

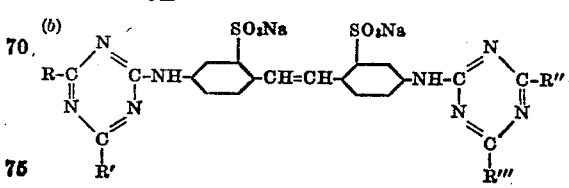

wherein R, R', R", and R''' represent hydroxyl or a monovalent organic radical.

2. A solution of a member of the group consisting of water-soluble carbohydrates and cellulose derivatives soluble in solvents containing a substantial amount of water, said solution containing a substantial amount of water, at most a small amount of electrolytes and a 1,3,5-triazine which is at most slightly colored one of the group of compounds consisting of

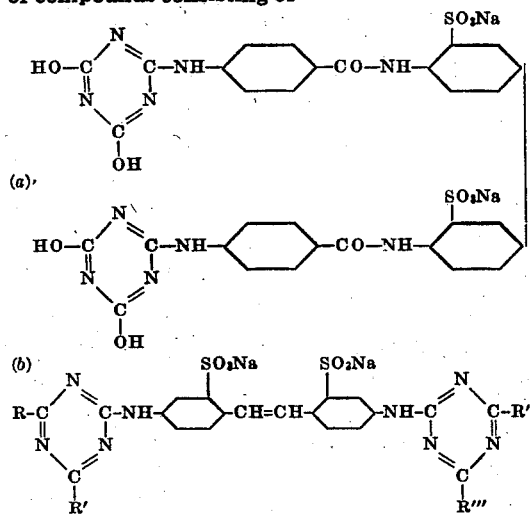

wherein R, R', R" and R''' represent hydroxyl or a monovalent organic radical.

3. The process as defined in claim 1 in which said 1,3,5-triazine derivative is a compound having the following formula:

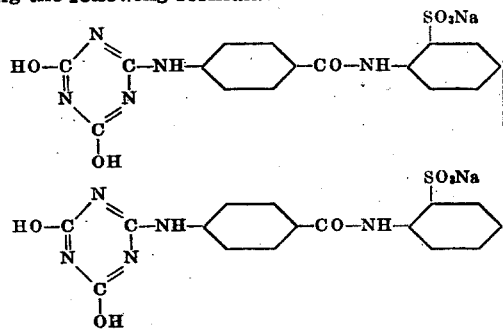

4. A process as defined in claim 1 in which said 1,3,5-triazine derivative is a compound having the following formula:

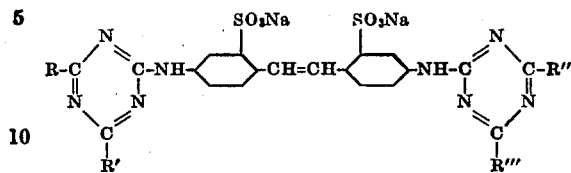

wherein R, R', R" and R''' represent hydroxyl or a monovalent organic radical.

5. A solution as defined in claim 2 in which said 1,3,5-triazine derivative is a compound having the following formula:

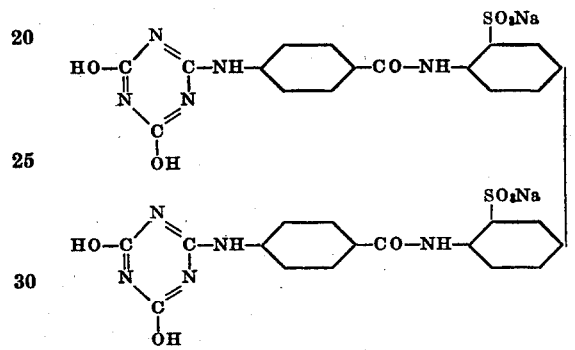

6. A solution as defined in claim 2 in which said 1,3,5-triazine derivative is a compound having the following formula:

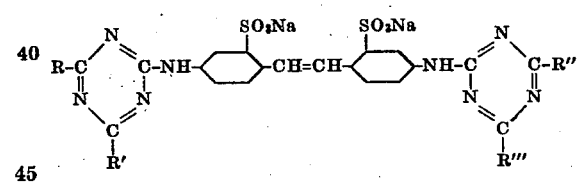

wherein R, R', R" and R''' represent hydroxyl or a monovalent organic radical.

BRUNO WENDT.